(12) United States Patent
Wang

(10) Patent No.: US 8,111,642 B2
(45) Date of Patent: Feb. 7, 2012

(54) USING TRAFFIC PATTERNS TO IMPROVE SLEEP MODE EFFICIENCY IN A RADIO HANDSET

(75) Inventor: Huaiyuan Wang, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1030 days.

(21) Appl. No.: 12/030,233

(22) Filed: Feb. 13, 2008

(65) Prior Publication Data

US 2009/0201843 A1    Aug. 13, 2009

(51) Int. Cl.
*H04W 52/02* (2009.01)
*H04W 52/26* (2009.01)
*H04J 3/00* (2006.01)
*G08C 17/02* (2006.01)

(52) U.S. Cl. ... 370/311; 370/336; 370/345; 370/395.21; 455/343.1; 455/522; 455/574

(58) Field of Classification Search ............... 370/311, 370/336, 345, 395.21; 455/343.1, 522, 574
See application file for complete search history.

(56) References Cited

U.S. PATENT DOCUMENTS

| | | | | |
|---|---|---|---|---|
| 7,280,506 B2 * | 10/2007 | Lin et al. | .................. | 370/331 |
| 7,590,079 B2 * | 9/2009 | Smavatkul et al. | ............ | 370/311 |
| 7,603,147 B2 * | 10/2009 | Son et al. | ..................... | 455/574 |
| 7,672,263 B2 * | 3/2010 | Sinivaara | ..................... | 370/318 |
| 7,693,555 B2 * | 4/2010 | Srinivasan et al. | ............ | 455/574 |
| 7,751,858 B2 * | 7/2010 | Chou | ............................ | 455/574 |
| 7,756,103 B2 * | 7/2010 | Alon et al. | ................... | 370/349 |
| 7,779,643 B2 * | 8/2010 | Simons | ........................ | 62/272 |
| 7,801,072 B2 * | 9/2010 | Son et al. | ..................... | 370/328 |
| 2005/0054389 A1 * | 3/2005 | Lee et al. | ..................... | 455/574 |
| 2005/0197171 A1 * | 9/2005 | Son et al. | ..................... | 455/574 |
| 2006/0002383 A1 * | 1/2006 | Jeong et al. | .................. | 370/360 |
| 2007/0218939 A1 * | 9/2007 | Lim et al. | ..................... | 455/528 |
| 2007/0237104 A1 | 10/2007 | Alon | | |
| 2008/0182567 A1 * | 7/2008 | Zhu et al. | ..................... | 455/418 |
| 2009/0141661 A1 * | 6/2009 | Li et al. | ........................ | 370/311 |

FOREIGN PATENT DOCUMENTS

| | | |
|---|---|---|
| EP | 1193985 A | 4/2002 |
| EP | 1 318 687 A2 | 6/2003 |
| WO | 2005002137 A | 1/2005 |
| WO | 2008111684 A | 9/2008 |

OTHER PUBLICATIONS

Ericsson: "A Semi-Autonomous DRX Control Scheme for LTE_ACTIVE", 3GPP Draft R@-071393, Mar. 20, 2007 XP050134332.
PCT Written Opinion of the International Preliminary Examining Authority corresponding to PCT/US2008/073806, mailed May 6, 2010, 8 pages.

* cited by examiner

*Primary Examiner* — Alpus H Hsu
(74) *Attorney, Agent, or Firm* — Snyder, Clark, Lesch & Chung, LLP

(57) ABSTRACT

Disclosed is a method of using observed traffic pattern data to improve sleep mode efficiency in a radio handset. The radio handset determines quality of service (QoS) requirements of an application currently executing on the radio handset and selects a pre-defined sleep mode mask from among a plurality of pre-defined sleep mode masks wherein the selected pre-defined sleep mode mask provides the closest available match in terms of sleep/listen pattern to the QoS requirements. The traffic pattern data between the radio handset and a serving basestation is observed while under the initial sleep/listen pattern of the selected pre-defined sleep mode mask or the reactivated sleep/listen pattern after sleep mode deactivation. An alternate sleep mode mask is created based on the observed traffic pattern data between the radio handset and the serving base station wherein the alternate sleep/listen pattern is better suited to the actual traffic pattern than the initial sleep/listen pattern of the selected pre-defined sleep mode mask or the reactivated sleep/listen pattern after sleep mode deactivation.

23 Claims, 6 Drawing Sheets

USING TRAFFIC PATTERNS TO IMPROVE SLEEP MODE EFFICIENCY IN A RADIO HANDSET

BACKGROUND

Radio handsets operating in sleep mode typically follow an alternating listen window/sleep window pattern to exchange data traffic with a serving base station and to conserve battery power. When the regular pattern is first started or disrupted by sleep mode deactivation or re-activation, the base station and the radio handset must decide when the next listen window will be before the radio handset goes back into sleep mode. The ultimate decision on the start of the next listen window is the responsibility of the base station. The decision is often based on a set of rigid rules. This works well for more or less fixed rate traffic common to applications like VoIP but is less ideal for variable or bursty traffic applications such as video downloading or streaming and web browsing. In addition, it completely ignores traffic dynamics on the uplink such as interactive gaming and video uploading. Moreover, in almost all contexts, the listen window may be out of alignment with the actual traffic arrival timing, causing unnecessary delay and/or jitter to the radio handset.

What is needed is a system and method for observing traffic patterns and using the observed data to dynamically alter the sleep and listen windows associated with the sleep mode operation.

SUMMARY

Disclosed is a method, radio handset, and computer readable medium for using observed traffic pattern data to improve sleep mode efficiency in a radio handset. The radio handset determines quality of service (QoS) requirements of an application currently executing on the radio handset and selects a pre-defined sleep mode mask from among a plurality of pre-defined sleep mode masks wherein the selected pre-defined sleep mode mask provides the closest available match in terms of sleep/listen pattern to the QoS requirements. In the case reactivating sleep mode after deactivation or disruption, the serving base station typically is not obligated to honor the original sleep/listen pattern before the deactivation that may result in a shift in sleep and listen windows. Upon initial start or reactivation of sleep mode operation, the actual traffic pattern between the radio handset and a serving basestation is observed. An alternate sleep mode mask is created based on the observed traffic pattern between the radio handset and the serving base station wherein the alternate sleep/listen pattern is better suited to the actual traffic pattern and burst arrival timing than the initial sleep/listen pattern selected based on the pre-defined sleep mode mask or the reactivated sleep/listen pattern after sleep mode deactivation. The altered sleep/listen pattern is then substituted for the initial sleep/listen pattern selected based on the pre-defined sleep mode mask or the reactivated sleep/listen pattern after sleep mode deactivation.

The observed traffic pattern data includes at least one of an inter-burst interval that specifies the time interval between two consecutive traffic bursts that corresponds to the sleep window of the sleep/listen pattern, an average burst length that specifies an average duration of each traffic burst that corresponds to the listen window of the sleep/listen pattern, and, for periodic bursts, an actual burst arrival timing, in conjunction with tolerable variation, that corresponds to the (re-)start of the first listen window in a sleep/listen pattern.

The signaling between the radio handset and base station can comprises in-band signaling in the form of a piggybacked sub header or out-band signaling in the form of an optional element embedded in a medium access control (MAC) management message.

DETAILED DESCRIPTION OF THE INVENTION

Figure 1:
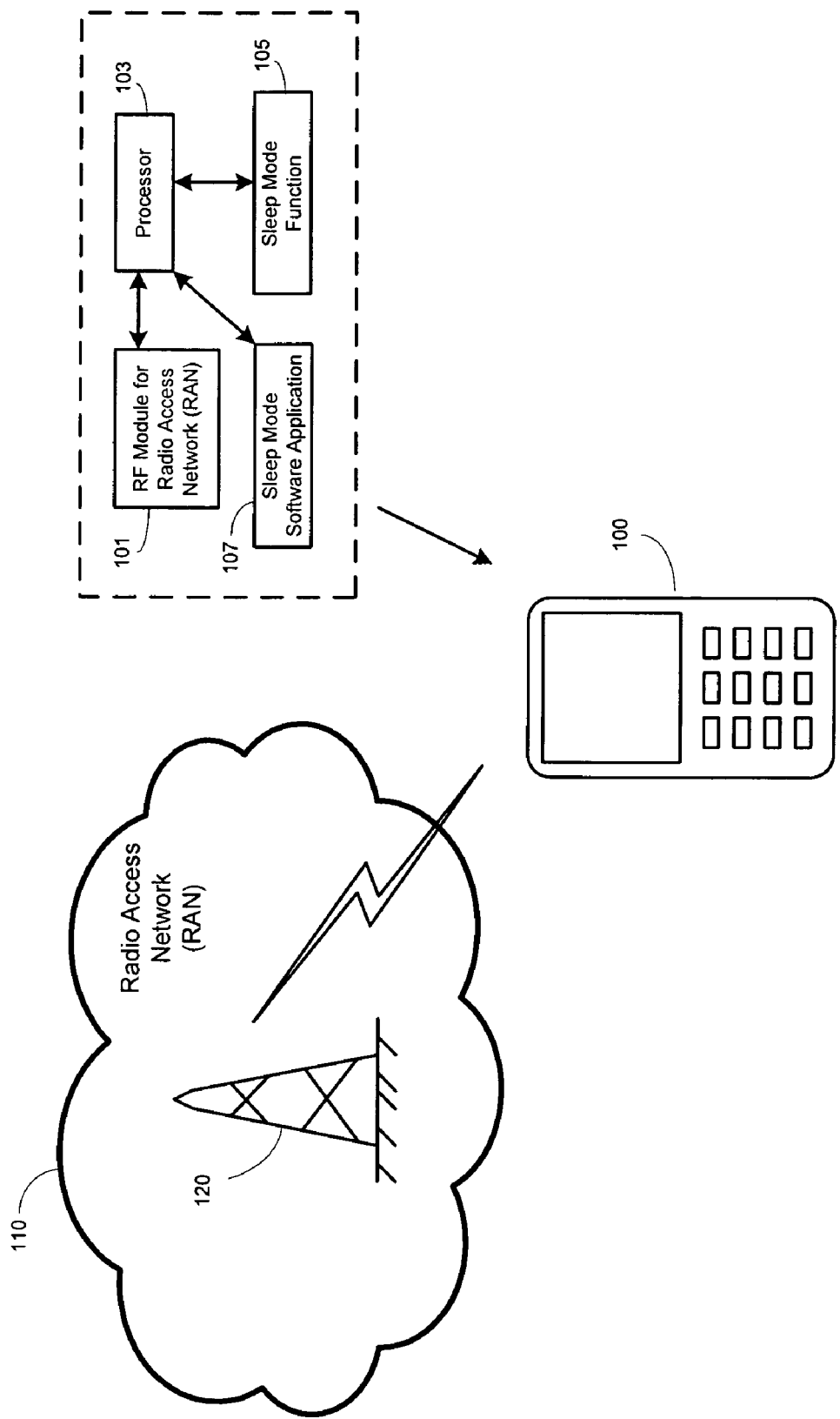
FIG. 1 is a network diagram illustrating communication between a radio handset and a radio access network (RAN).

FIG. 1 is a network diagram illustrating communication between a radio handset and a radio access network (RAN). The radio handset 100 includes a processor 103 that controls the overall operation of the radio handset 100. The processor 103 is coupled with an RF module 101 capable of communication with a separate radio access network (RAN) 110 via a base station 120. The radio handset 100 also includes a sleep mode function 105 and a sleep mode software application 107 that manages a sleep mode comprised of sleep windows and listen windows.

To conserve battery power, a radio handset will enter a sleep mode state while running an application. Sleep mode is a state defined as an alternating sleep window and listen window. The radio handset exchanges data traffic with the base station it is currently camped on during the listen window period. In the sleep window period, the radio handset can conserve battery power.

Figure 2:
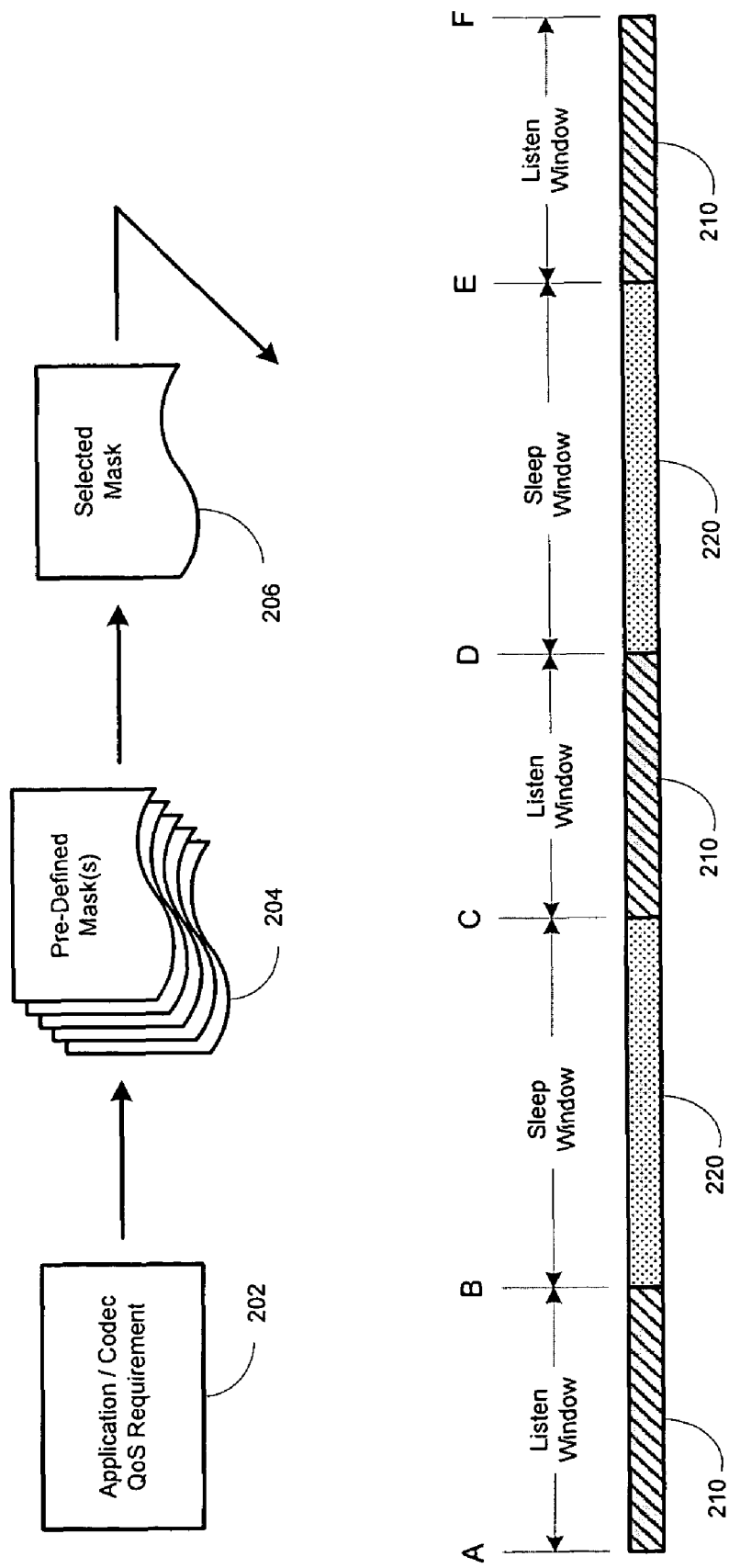
FIG. 2 is a prior art representation of a typical process in determining initial sleep/listen pattern and the sleep mode operation thereafter.

FIG. 2 is a prior art representation of a typical process in determining initial sleep/listen pattern and the sleep mode operation thereafter. The radio handset considers the current application running on the radio handset with respect to quality of service (QoS) requirements. 202. Applications can include voice, video streaming, audio streaming, web-browsing, etc. that have varying QoS requirements. Since a radio handset can support multiple applications, there are typically a plurality of pre-defined sleep mode masks 204 stored in the radio handset. Some intelligence is applied to select one of the pre-defined sleep mode masks 204 based on the QoS requirements 202 of the application running. The selected sleep mode mask 206 defines listen and sleep windows of the sleep mode that is the closest fit between to the QoS requirements 202 of the application. The sleep mode mask 206 is typically an alternating sequence of fixed time intervals for the listen window 210 and the sleep window 220. During the listen window 210 the radio handset can exchange uplink (UL) and downlink (DL) data traffic with the base station to which it is currently connected. During the sleep window 220, the radio handset can sleep or scan the current network for a neighboring base station.

In operation, the radio handset enters a listen window 210 at time "A" and starts exchanging data traffic with the basestation (BS) to which it is currently connected. At time "B", the radio handset exits the listen window 210 and enters a sleep window 220. During the sleep window 220, the base station will buffer downlink data traffic destined for the radio handset. The radio handset can spend the time scanning for neighboring base stations or simply conserving power. At time "C" the radio handset is forced to enter the next listen window 210 and tune back into the base station regardless of whether it finished its scan during the sleep window 220. The base station assumes the radio handset is back and begins sending any buffered data as well as any real-time data on the downlink. If the radio handset has failed to tune back in, it will trigger unnecessary re-transmissions of data and could adversely affect system throughput.

Figure 3:
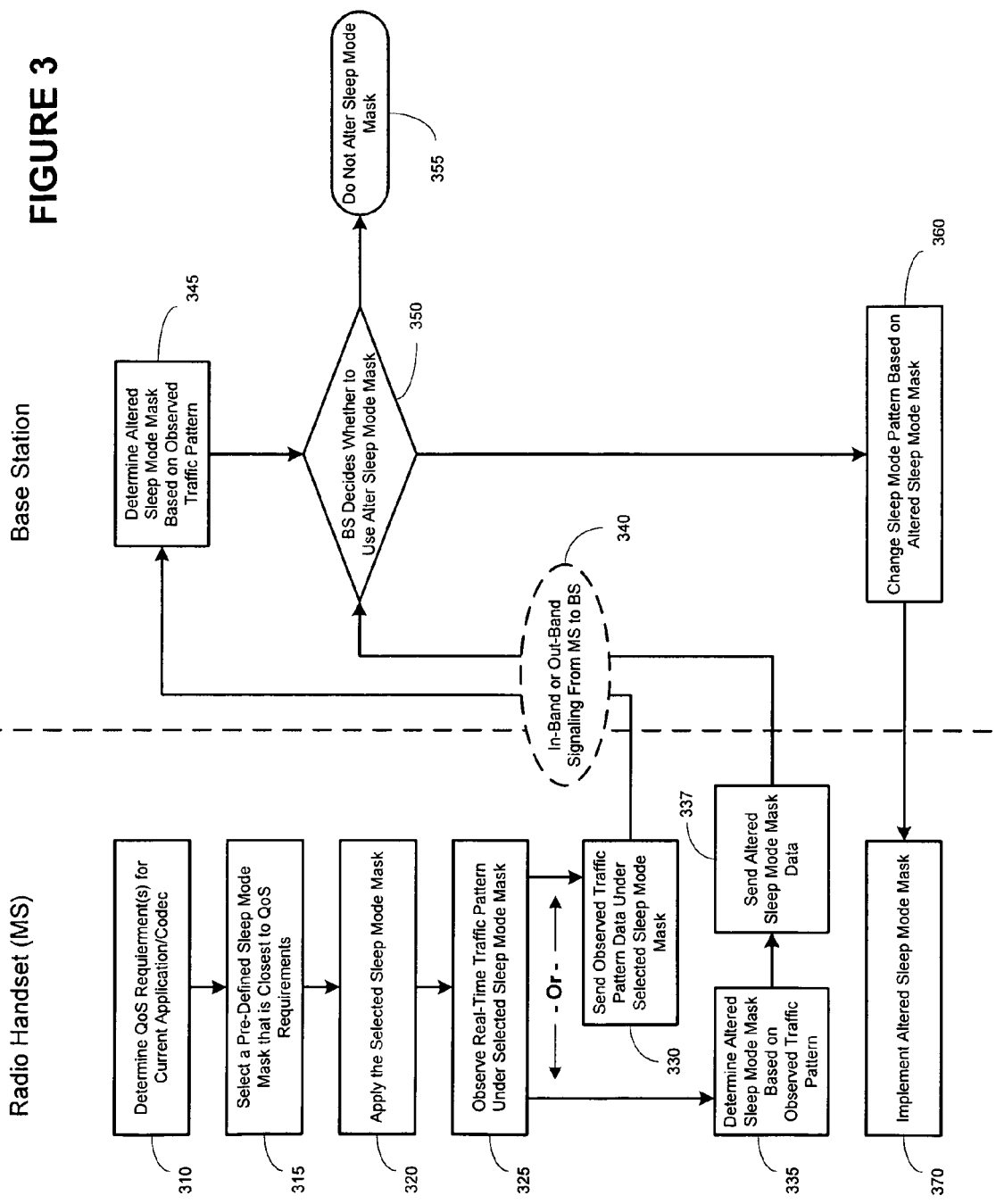
FIG. 3 is a flowchart for altering the sleep mode of a radio handset according to an embodiment of the present invention.

FIG. 3 is a flowchart for altering the sleep mode of a radio handset according to an embodiment of the present invention. Typically, the radio handset will determine the quality of service (QoS) requirements of the application and/or codec running on the radio handset 310. Using that information, a pre-defined sleep mode mask is selected that best fits the QoS requirements 315 from among a plurality of varying sleep mode masks. The radio handset then applies the selected sleep mode mask 320 in coordination with the serving base station. The associated listen and sleep windows for that sleep mode mask are then activated. While operating under the selected sleep mode mask, the radio handset will observe the real-time traffic pattern 325.

The observed actual traffic pattern data can then be used to refine or alter the sleep mode mask to provide a better fit to actual conditions. For instance, the radio handset may suffer unnecessary delay if the listen window starts much later than the actual burst arrival. Or, the radio handset may suffer higher power consumption if listen window starts way ahead the actual burst arrival. If the listen is defined too small, the radio handset may no be able to receive the entire burst resulting in an unpleasant user experience. In the contrary, the radio handset will burn more battery power if its listen window is larger than the actual burst size because the radio handset must stay awake during listen windows regardless of whether there is traffic between it and the serving base station. Altering the sleep mode mask could alleviate such problems and may also be able to improve resource planning and distribution that can lead to even better QoS and load balancing.

The radio handset in conjunction with the serving base station has two options for altering the sleep mode mask. The first option would be for the radio handset to send the observed traffic pattern data to the base station 330. The second option would be for the radio handset to determine an altered sleep mode mask based on the observed traffic data 335 and then send the altered sleep mode mask data 337 to the serving base station.

In the first embodiment, the base station receives 340 the observed traffic pattern data and it determines an altered sleep mode mask 345. The base station would then decide whether to implement the altered sleep mode mask 350. In the second embodiment, the altered sleep mode mask is sent 340 directly to the base station which would decide whether to implement the altered sleep mode mask 350. The base station could decide not to implement the altered sleep mode mask 355. Otherwise, the base station will signal the radio handset in the next listening window as to the changes made to the current sleep mode mask 360. The radio handset will then implement the altered sleep mode mask 370.

The signaling between the radio handset and the serving base station 340 can be performed using in-band signaling or out-band signaling.

Figure 4:
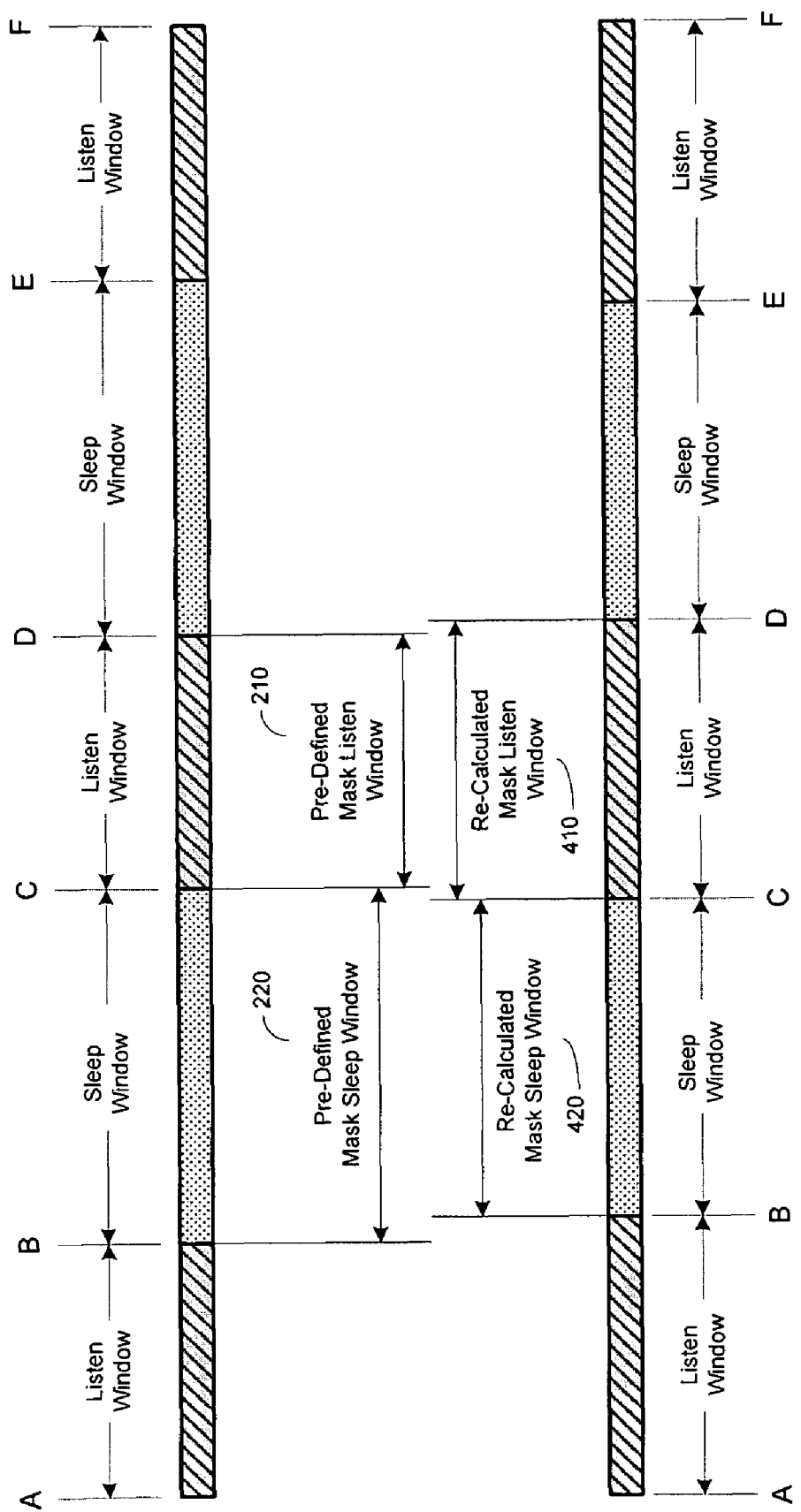
FIG. 4 is a representation of a sleep window/listen window sequence for an altered sleep mode as compared to the sleep mode of the initially selected sleep mode mask according to an embodiment of the invention.

FIG. 4 is a representation of a sleep window/listen window sequence for an altered sleep mode mask as compared to the sleep window/listen window sequence of the initially selected sleep mode mask according to an embodiment of the invention. The top portion illustrates the same listen window/sleep window sequence as that shown in FIG. 1. The bottom portion illustrates an example of an altered sleep mode mask generated according to one of the embodiments of the invention. The sleep window of the predefined sleep mode mask 220 has been shortened in the re-calculated sleep window of the altered sleep mode mask 420 while the listen window of the predefined sleep mode mask 210 has been lengthened in the re-calculated listen window of the altered sleep mode mask 410. This will result in a longer period of time in which the radio handset and the serving base station can exchange traffic and it also shifts the start/stop times of the windows in hopes of matching the actual traffic arrival timing to the re-configured sleep/listen pattern.

As previously mentioned, the step of signaling the serving base station with respect to observed traffic pattern data or a proposed altered sleep mode mask can be achieved using an in-band signaling mechanism or an out-band signaling mechanism. In-band signaling can be in the form of a piggyback subheader or bandwidth stealing. Out-band signaling can be in the form of an information element embedded in a medium access control (MAC) management message.

As described above, in one embodiment, the radio handset observes the relevant traffic patterns and signals them to the base station. The base station then processes the data to determine an altered sleep/listen pattern. In another embodiment, the radio handset observes the relevant traffic patterns and processes the data to determine an altered sleep/listen pattern. The radio handset then signals the proposed altered sleep/listen pattern to the base station.

Figure 5A:
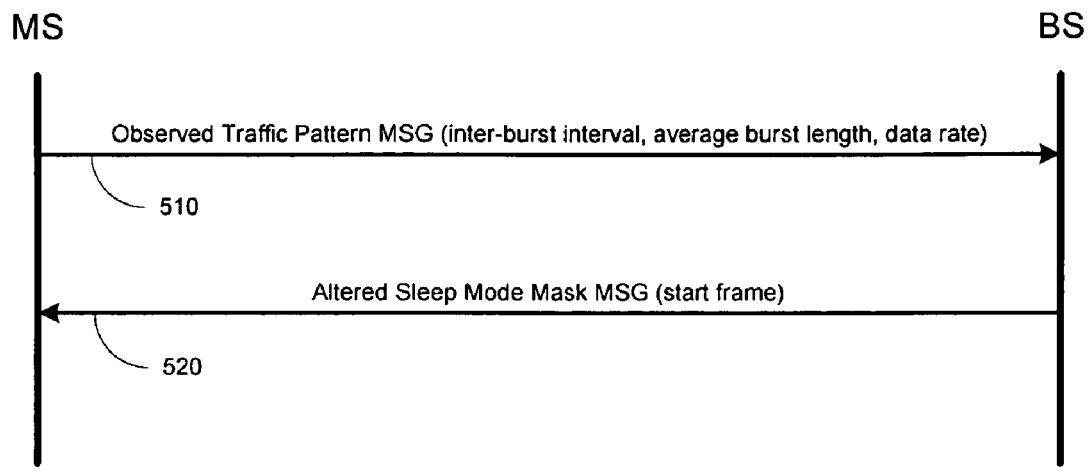
FIGS. 5A and 5B illustrate one method of providing in-band signaling between a radio handset and a base station.
Figure 5B:
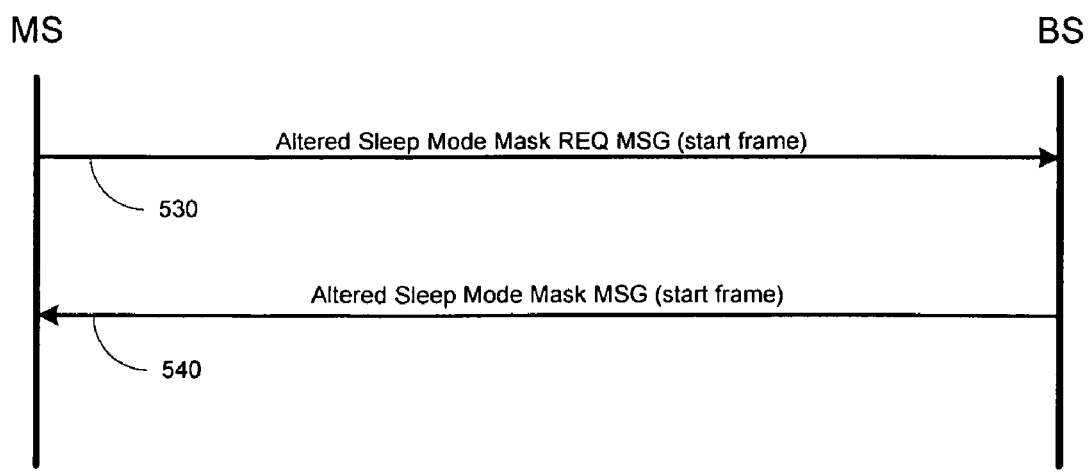

FIGS. 5A and 5B illustrate one method of providing in-band signaling between a radio handset and a base station.

FIG. 5A addresses the scenario in which the radio handset observes the relevant traffic patterns and signals them to the base station. In this embodiment, the radio handset (MS) will create and send a message to the current base station (BS) that can be termed an "Observed Traffic Pattern MSG" 510 having parameters such as inter-burst interval, average burst length, and burst arrival timing. The base station determines an altered sleep/listen pattern using the data and responds with an "Altered Sleep Mode Mask MSG" 520 that includes a start frame parameter that indicates when to switch to the altered sleep/listen pattern.

FIG. 5B addresses the scenario in which the radio handset observes the relevant traffic patterns, determines an altered sleep/listen pattern and signals it to the base station. In this embodiment, the radio handset (MS) will create and send a message to the current base station (BS) that can be termed an "Altered Sleep Mode Mask REQ MSG" 530 that contains data pertaining to an altered sleep/listen pattern. The base station responds with an "Altered Sleep Mode Mask MSG" 540 that includes a start frame parameter that indicates when to switch to the altered sleep/listen pattern.

Figure 6A:
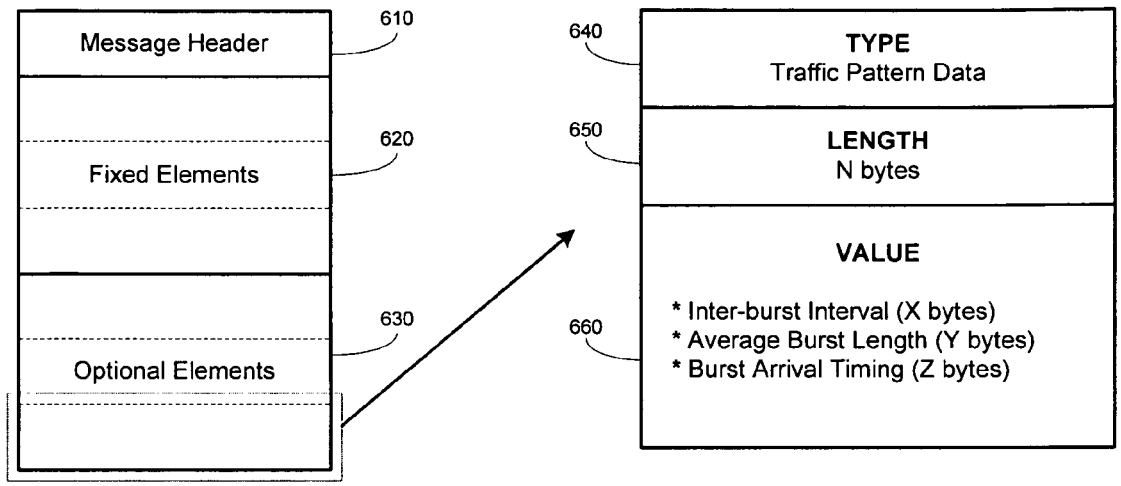
FIGS. 6A and 6B illustrate one method of providing out-band signaling between a radio handset and a base station.
Figure 6B:
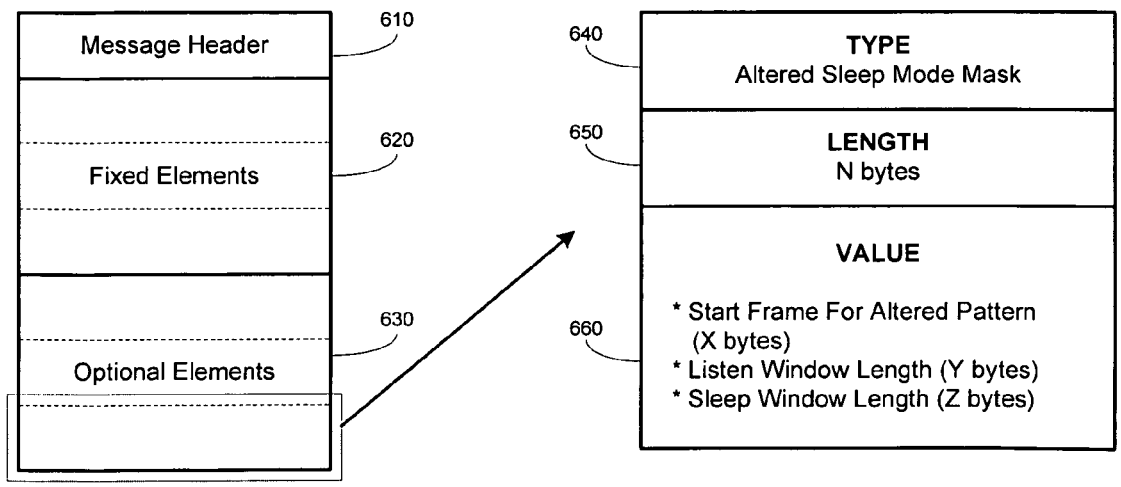

FIGS. 6A and 6B illustrate one method of providing out-band signaling between a radio handset and a base station. A typical MAC management message format comprises a message header 610, fixed elements 620, and optional elements 630. Each element (fixed or optional) is presented in a type/length/value (TLV) form in which the type defines the kind of element, the length defines the length of the element usually in bytes, and the value defines the message encoding. For purposes of the invention, a TLV can be embedded in one of the optional element sections 630 of a MAC management message.

FIG. 6A addresses the scenario in which the radio handset observes the relevant traffic patterns and signals them to the base station. In this embodiment, the type 640 for the optional embedded element 630 can be assigned "Traffic Pattern Data", the length 650 can be N number of bytes, and the value 660 can be split among the bytes to include an inter-burst interval (X bytes), an average burst length (Y bytes), and burst arrival timing (Z bytes).

FIG. 6B addresses the scenario in which the radio handset observes the relevant traffic patterns, determines an altered sleep mode mask and signals it to the base station. In this embodiment, the type 640 for the optional embedded element 630 can be assigned "Altered Sleep Mode Mask", the length 650 can be N number of bytes, and the value 660 can be split among the bytes to include a start frame for the altered sleep/listen pattern, a listen window length, and a sleep window length.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present invention may be presented and responded to via a graphical user interface (GUI) presented on the display of the mobile communications device or the like. Prompts may also be audible, vibrating, etc.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method comprising:
    determining quality of service (QoS) requirements of an application currently executing on a radio handset;
    selecting a pre-defined sleep mode mask from among a plurality of pre-defined sleep mode masks, wherein the selected pre-defined sleep mode mask provides a closest available match in terms of sleep/listen pattern to the QoS requirements;
    observing a traffic pattern and arrival timing between the radio handset and a serving basestation while under an initial sleep/listen pattern of the selected pre-defined sleep mode mask or a reactivated sleep/listen pattern after sleep mode deactivation;
    determining an altered sleep mode mask based on the observed traffic pattern and arrival timing between the radio handset and the serving base station; and
    creating an alternate sleep/listen pattern based on the altered sleep mode mask, wherein the alternate sleep/listen pattern is better suited to the actual traffic pattern and arrival timing than the initial sleep/listen pattern of the selected pre-defined sleep mode mask or the reactivated sleep/listen pattern after sleep mode deactivation.

2. The method of claim 1 further comprising:
    substituting the alternate sleep/listen pattern for the initial sleep/listen pattern of the selected pre-defined sleep mode mask or the reactivated sleep/listen pattern after sleep mode deactivation.

3. The method of claim 2 further comprising:
    sending, from the radio handset, observed traffic pattern data to the serving base station via in-band signaling.

4. The method of claim 3 wherein the in-band signaling comprises a piggy-backed sub header.

5. The method of claim 2 further comprising:
    sending, from the radio handset, observed traffic pattern data to the serving base station via out-band signaling.

6. The method of claim 5 wherein the out-band signaling comprises an optional element embedded in a medium access control (MAC) management message.

7. The method of claim 1, wherein the observed traffic pattern data includes at least one of an inter-burst interval that specifies a time interval between two consecutive traffic bursts that corresponds to a sleep window of the sleep/listen pattern, an average burst length that specifies average duration of each traffic burst that corresponds to a listen window of the sleep/listen pattern, and, for periodic bursts, an actual burst arrival timing, in conjunction with tolerable variation, that corresponds to a re-start of a first listen window in a sleep/listen pattern.

8. A radio handset comprising:
    a processor configured to control the operation of the radio handset;
    an RF module coupled with the processor and configured to communicate with a serving base station; and
    a sleep mode software application configured to:
        determine quality of service (QoS) requirements of an application currently executing on the radio handset;
        select a pre-defined sleep mode mask from among a plurality of pre-defined sleep mode masks wherein the selected pre-defined sleep mode mask provides a closest available match in terms of sleep/listen pattern to the QoS requirements;
        observe traffic pattern and arrival timing between the radio handset and the serving base station while under an initial sleep/listen pattern of the selected pre-defined sleep mode mask or a reactivated sleep/listen pattern after sleep mode deactivation;
        determine an altered sleep mode mask based on the observed traffic pattern and arrival timing between the radio handset and the serving base station; and
        create an alternate sleep/listen pattern based on the altered sleep mode mask, wherein the alternate sleep/listen pattern is better suited to the actual traffic pattern than the initial sleep/listen pattern of the selected pre-defined sleep mode mask or the reactivated sleep/listen pattern after sleep mode deactivation.

9. The radio handset of claim 8 wherein the sleep mode software application is further configured to substitute the altered sleep mode mask for the selected pre-defined sleep mode mask.

10. The radio handset of claim 9 wherein the sleep mode software application is further configured to send observed traffic pattern data to the serving base station via in-band signaling.

11. The radio handset of claim 10 wherein the in-band signaling comprises a piggy-backed sub header.

12. The radio handset of claim 9 wherein the sleep mode software application is further configured to send observed traffic pattern data to the serving base station via out-band signaling.

13. The radio handset of claim 12 wherein the out-band signaling comprises an optional element embedded in a medium access control (MAC) management message.

14. The radio handset of claim 8 wherein the observed traffic pattern data includes at least one of an inter-burst interval that specifies a time interval between two consecutive traffic bursts that corresponds to a sleep window of the sleep/listen pattern, an average burst length that specifies average duration of each traffic burst that corresponds to a listen window of the sleep/listen pattern, and, for periodic bursts, an actual burst arrival timing, in conjunction with tolerable variation, that corresponds to a re-start of a first listen window in a sleep/listen pattern.

15. The radio handset of claim 8 wherein the radio handset signals the serving base station to request that the altered sleep/listen pattern be implemented, wherein the request includes data defining the altered sleep/listen pattern.

16. The radio handset of claim 15 wherein the radio handset receives an acknowledgment from the base station indicating that the request has been granted wherein the acknowledgement includes a start frame parameter that defines when the altered sleep/listen pattern will be implemented.

17. A non-transitory computer readable medium storing a computer program product comprising:
    computer program code for determining quality of service (QoS) requirements of an application currently executing on a radio handset;
    computer program code for selecting a pre-defined sleep mode mask, wherein the selected pre-defined sleep mode mask provides a closest available match in terms of sleep/listen pattern to the QoS requirements;

computer program code for observing traffic pattern data between the radio handset and a serving base station while under an initial sleep/listen pattern of the selected pre-defined sleep mode mask or a reactivated sleep/listen pattern after sleep mode deactivation;

computer program code for determining an altered sleep mode mask based on the observed traffic pattern and arrival timing between the radio handset and the serving base station; and computer program code for creating an alternate sleep/listen pattern based on the altered sleep mode mask, wherein the alternate sleep/listen pattern is better suited to the actual traffic pattern than the initial sleep/listen pattern of the selected pre-defined sleep mode mask or the reactivated sleep/listen pattern after sleep mode deactivation.

18. The non-transitory computer readable medium of claim 17 further comprising:

computer program code for substituting the alternate sleep/listen pattern for the initial sleep/listen pattern of the selected pre-defined sleep mode mask or the reactivated sleep/listen pattern after sleep mode deactivation.

19. The non-transitory computer readable medium of claim 18 wherein the observed traffic pattern data includes at least one of an inter-burst interval that specifies a time interval between two consecutive traffic bursts that corresponds to a sleep window of the sleep/listen pattern, an average burst length that specifies average duration of each traffic burst that corresponds to a listen window of the sleep/listen pattern, and, for periodic bursts, an actual burst arrival timing, in conjunction with tolerable variation, that corresponds to a re-start of a first listen window in a sleep/listen pattern.

20. The non-transitory computer readable medium of claim 19 further comprising:

computer program code for sending observed traffic pattern data to the serving base station via in-band signaling.

21. The non-transitory computer readable medium of claim 20 wherein the in-band signaling comprises a piggy-backed sub header.

22. The non-transitory computer readable medium of claim 19 further comprising:

computer program code for sending observed traffic pattern data to the serving base station via out-band signaling.

23. The non-transitory computer readable medium of claim 22 wherein the out-band signaling comprises an optional element embedded in a medium access control (MAC) management message.

* * * * *